US011550505B1

(12) United States Patent
Gupta et al.

(10) Patent No.: US 11,550,505 B1
(45) Date of Patent: Jan. 10, 2023

(54) INTRA-SHARD PARALLELIZATION OF DATA STREAM PROCESSING USING VIRTUAL SHARDS

(71) Applicant: Amazon Technologies, Inc., Seattle, WA (US)

(72) Inventors: Dinesh Saheblal Gupta, Bellevue, WA (US); Deepak Verma, Seattle, WA (US); Jiaxuan Lu, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 181 days.

(21) Appl. No.: 17/008,998

(22) Filed: Sep. 1, 2020

(51) Int. Cl.
    *G06F 3/06* (2006.01)
    *G06F 9/38* (2018.01)
    *G06F 9/48* (2006.01)

(52) U.S. Cl.
    CPC .......... *G06F 3/0659* (2013.01); *G06F 3/0604* (2013.01); *G06F 3/0665* (2013.01); *G06F 3/0673* (2013.01); *G06F 9/3885* (2013.01); *G06F 9/4843* (2013.01); *G06F 9/4881* (2013.01)

(58) Field of Classification Search
    None
    See application file for complete search history.

(56) References Cited

U.S. PATENT DOCUMENTS

| 9,411,862 | B1 * | 8/2016 | Wang | G06F 16/2455 |
| 9,811,546 | B1 * | 11/2017 | Bent | G06F 16/2228 |
| 9,875,272 | B1 * | 1/2018 | Jhingran | G06F 16/278 |
| 9,928,141 | B1 * | 3/2018 | Franklin | G06F 11/1012 |
| 10,089,176 | B1 * | 10/2018 | Donlan | H04L 67/1097 |
| 10,423,387 | B2 * | 9/2019 | Johnson | G06F 7/08 |
| 10,528,265 | B1 * | 1/2020 | Malina | G06F 3/067 |
| 10,977,275 | B1 * | 4/2021 | Bauer | G06F 16/2379 |
| 11,113,244 | B1 * | 9/2021 | Chen | G06F 16/1748 |
| 2011/0314019 | A1 | 12/2011 | Jimenez et al. | |
| 2015/0186519 | A1 * | 7/2015 | Popov | G06F 16/951 707/723 |

(Continued)

OTHER PUBLICATIONS

Venkateswaran, Narayanan et al. "Simplified Data Partitioning in a Consistent Hashing Based Sharding Implementation". Proc. of the 2017 IEEE Region 10 Conference (TENCON), Malaysia, November 5-8. (Year: 2017).*

(Continued)

*Primary Examiner* — Adam Lee
(74) *Attorney, Agent, or Firm* — BakerHostetler

(57) ABSTRACT

A data stream may include a plurality of records that are ordered, and the plurality of records may be assigned to a processing shard. A first set of virtual shards may be formed, the first set of virtual shards having a first quantity of virtual shards that perform parallel processing operations on behalf of the processing shard. First records of the plurality of records may be processed using the first set of virtual shards. The first quantity of virtual shards may be modified, based at least in part on an observed record age, to a second quantity of virtual shards that perform parallel processing operations on behalf of the processing shard. A second set of virtual shards may be formed having the second quantity of virtual shards. Second records of the plurality of records may be processed using the second set of virtual shards.

20 Claims, 11 Drawing Sheets

(56) References Cited

U.S. PATENT DOCUMENTS

| | | | |
|---|---|---|---|
| 2015/0302047 A1* | 10/2015 | Amigud | G06F 16/2282 |
| | | | 707/700 |
| 2017/0103116 A1* | 4/2017 | Hu | G06F 16/2272 |
| 2018/0060037 A1* | 3/2018 | Johnson | G06F 16/2379 |
| 2018/0165015 A1* | 6/2018 | Malina | H03M 13/154 |
| 2018/0165016 A1* | 6/2018 | Malina | G06F 3/0652 |
| 2020/0104378 A1* | 4/2020 | Wagner | G06F 9/546 |
| 2020/0117637 A1* | 4/2020 | Roy | G06F 16/137 |
| 2021/0089504 A1* | 3/2021 | Liu | G06N 5/04 |

OTHER PUBLICATIONS

Lopez et al.; "A Performance Comparison of Open-Source Stream Processing Platforms"; IEEE; 2016; 6 pages.

\* cited by examiner

| Record Age Information 200 ||
| --- | --- |
| Sample Time 211 | Observed Record Age 212 |
| Minute x+4 | 15 minutes |
| Minute X+3 | 13.5 minutes |
| Minute X+2 | 12 minutes |
| Minute X+1 | 10.5 minutes |
| Minute X | 9 minutes |

| Threshold Information 201 |
| --- |
| Current Observed Record Age > Threshold Record Age = Yes (e.g., Threshold Record Age = 70% of Target Record Age) |

| Calculations 202 |
| --- |
| New PF = Current PF (1 + Record Age Growth Rate)<br>5 = 2 (1 + 1.5)<br>Maximum Parallelization Factor = 7 |

| Actions 203 |
| --- |
| Increase from 2 to 5 virtual shards |

FIG. 2

| Record Age Information 400 ||
|---|---|
| Sample Time 211 | Observed Record Age 212 |
| Minute X+6 (End First Cool-Off Period) | 16.2 minutes |
| Minute X+5 | 15.6 minutes |
| Minute X+4 (Start First Cool-Off Period) | 15 minutes |
| Minute X+3 | 13.5 minutes |
| Minute X+2 | 12 minutes |
| Minute X+1 | 10.5 minutes |
| Minute X | 9 minutes |

| Threshold Information 401 |
|---|
| Current Observed Record Age > Threshold Record Age = Yes (e.g., Threshold Record Age = 70% of Target Record Age) |

| Calculations 402 |
|---|
| New PF = Current PF (1 + Record Age Growth Rate)<br>8 = 5 (1 + .6)<br>Maximum Parallelization Factor = 7 |

| Actions 403 |
|---|
| Increase from 5 to 7 virtual shards |

FIG. 4

| Record Age Information 600 ||
| --- | --- |
| Sample Time 211 | Observed Record Age 212 |
| Minute X+8 (End Second Cool-Off Period) | 15.2 minutes |
| Minute X+7 | 15.7 minutes |
| Minute X+6 (Start Second Cool-Off Period) | 16.2 minutes |
| Minute X+5 | 15.6 minutes |
| Minute X+4 | 15 minutes |
| Minute X+3 | 13.5 minutes |
| Minute X+2 | 12 minutes |
| Minute X+1 | 10.5 minutes |
| Minute X | 9 minutes |

| Decrease Rules 601 |
| --- |
| Decrease Parallelization Factor by One when Below Conditions are Satisfied:<br><br>Below Target Record Age= Yes<br><br>Below Threshold = No<br>(e.g., 70% of target record age)<br><br>Decrease Would not Cause a Drop Below Minimum Parallelization Factor |

| Actions 602 |
| --- |
| Decrease from 7 to 6 virtual shards |

FIG. 6

INTRA-SHARD PARALLELIZATION OF DATA STREAM PROCESSING USING VIRTUAL SHARDS

BACKGROUND

Data stream processing may include processing of a data stream that includes multiple ordered records. Records in a data stream may be assigned various values to indicate their order, such as partition key values and sequence numbers. One or more shards may be used to process a data stream, and a given record may be assigned to a shard based on a key value that is assigned to the record. This may help to ensure that all records are processed in order. Problems may occur when records are input to a shard at a faster rate than the shard is able to process the records. This may cause stream processing to lag. The lag of stream processing may sometimes be a systematic issue, in which the rate of processing is always slower than the input rate. It may also be a transient issue, in which the data is not evenly distributed, and some shards have more data to process than other shards. A shard may also experience a processing lag due to other factors, such as when data residing on the shard goes through more complex processing than data on other shards.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 2 is a diagram illustrating first example monitoring information in accordance with the present disclosure.

FIG. 4 is a diagram illustrating second example monitoring information in accordance with the present disclosure.

FIG. 6 is a diagram illustrating third example monitoring information in accordance with the present disclosure.

DETAILED DESCRIPTION

Figure 1:
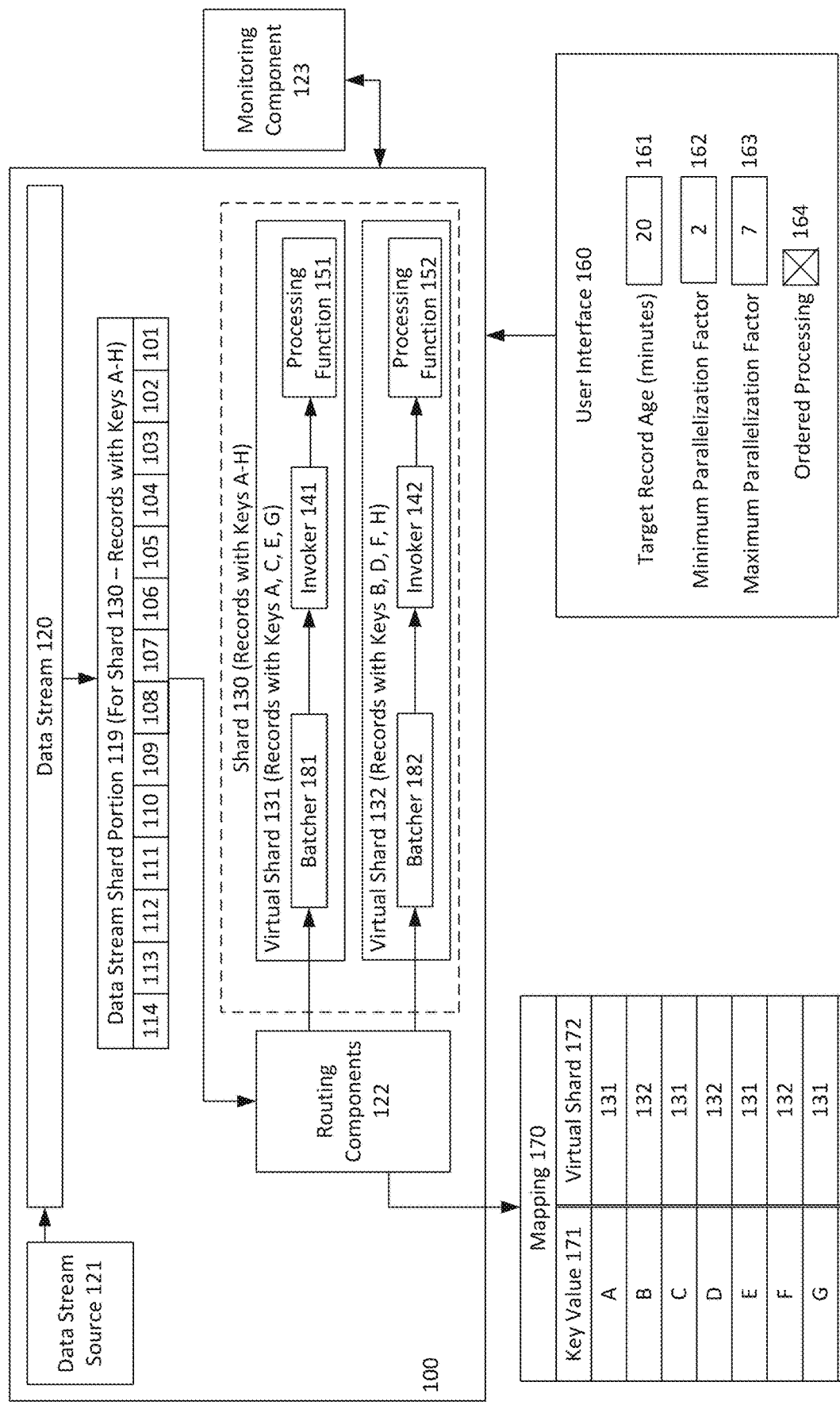
FIG. 1 is a diagram illustrating an example data stream processing system and user interface configuration that may be used in accordance with the present disclosure.

Techniques for intra-shard parallelization of data stream processing using virtual shards are described herein. The techniques described herein may include processing of a data stream that includes multiple ordered records. Records in a data stream may be assigned various values to indicate their order, such as partition key values and sequence numbers. One or more shards may be used to process a data stream, and a given record may be assigned to a shard based on a key value that is assigned to the record. All records that have the same key value may be assigned to the same shard for processing.

In some conventional techniques, multiple shards may execute in parallel to process a single data stream. However, in order to help ensure that the data records are processed in order, each shard may be limited to only a single consumer that can process the shard. One problem that results from this conventional model is that the ability to perform parallel processing on records assigned to the same shard may be limited. This may result in various problems. For example, if records are being input to a particular shard at a faster rate than the shard is processing the records, then the shard's processing may begin to lag. As processing continues, the shard's processing delay may gradually increase, and the shard may continue to gradually lag further behind other shards.

In contrast to the conventional techniques described in the above paragraph, the techniques described herein may allow intra-shard parallelization of data stream processing. Specifically, the techniques described herein may allow a given shard's processing load to be distributed across two or more smaller shards, referred to herein as virtual shards, whose records are processed in parallel with one another. A shard, as that term is used herein, refers to components that receive, batch and process records. A shard may receive records at a constant input rate. A virtual shard, as that term is used herein, refers components that receive, batch and process records in parallel with one or more other virtual shards that are used to implement a single shard. The input rate of records to a shard may be equal to the sum of the input rates of records to all virtual shards that are used to implement the shard. Thus, the rate at which records are input to a virtual shard may be dependent on how many virtual shards are used to implement a shard. In some examples, a mapping may be maintained that maps partition key values to virtual shards. This may help to ensure that those records are processed in order. In some examples, the mapping may be adjusted dynamically during processing as new virtual shards are added or existing virtual shards are removed.

In some examples, a parallelization factor may indicate a quantity of virtual shards across which a shard's processing load may be distributed. The parallelization factor may be adjusted dynamically, after processing of records has already started. This may allow the parallelization factor to be adjusted in response to observed processing conditions, such as whether, and how quickly, a processing delay is increasing or decreasing. The disclosed techniques may therefore allow a parallelization factor to be increased in response to processing delays, thereby allowing the delays to be reduced. Additionally, when a processing delay is reduced to an acceptable level, the techniques disclosed herein may also allow the parallelization factor to be decreased, thereby potentially reducing resource usage and customer costs.

The parallelization factor may be adjusted dynamically based on various parameters, any or all which may be selected by a user. These parameters may include, for example, a target record age, a minimum parallelization factor, and a maximum parallelization factor. Additionally, in some examples, a group of virtual shards that correspond to a common shard may be monitored throughout processing. For example, a record age of records that are processed by the virtual shards may be monitored. The record age may be used to indicate an amount of a processing delay associated with the virtual shards. If the record age is increasing, then this may indicate that a processing delay for the virtual shards is increasing. By contrast, if the record age is decreasing, then this may indicate that a processing delay for the virtual shards is decreasing.

In some cases, a computer-executed monitoring component may monitor the record age (referred to herein as the observed record age) to determine if, and to what extent, the observed record age is increasing, decreasing or remaining constant over time. The computer-executed monitoring component may also compare the observed record age to a threshold record age that is based on the target record age (e.g., 70% of the target record age). Based on this and optionally other information, the computer-executed monitoring component may then determine whether (and by how much) the parallelization factor will increase or decrease (or remain constant). For example, in some cases, if the observed record age is increasing, and if the observed record age has met or exceeded the threshold record age, then the parallelization factor may be increased. In some examples, the amount of this increase may be based, at least in part, on the rate by which the record age has increased over a recent time window. In some cases, however, the parallelization factor may not be permitted to exceed a maximum parallelization value parameter that may be selected by the user. Additionally, in some cases, if the observed record age is decreasing, and if the observed record age is between the target record age and the threshold record age, then the parallelization factor (i.e., the quantity of virtual shards) may be decreased. In some examples, the amount of this decrease may be based, at least in part, on the rate by which the record age has decreased over a recent time window. In some cases, however, the parallelization factor may not be permitted to drop below a minimum parallelization value parameter that may be selected by the user. Thus, in some examples, while a user may select certain parameters (e.g., target record age, minimum and maximum parallelization factor, etc.), the dynamic adjustment of the parallelization factor may be performed automatically (e.g., by computer-executed components) without requiring the user to continually monitor and make adjustments to the processing configuration.

FIG. 1 is a diagram illustrating an example data stream processing system and user interface configuration that may be used in accordance with the present disclosure. As shown, data stream processing system 100 includes a data stream source 121 that generates a data stream 120. A data stream, as that term is used herein, refers to a stream of ordered data records. Records in a data stream may be assigned various values to indicate their order, such as partition key values and sequence numbers. For example, a sequence number may be unique within a given partition key and may be used to indicate a relative order of records within the given partition key. Put another way, if two or more records have the same partition key value, then their sequence numbers may be used to determine their relative order. By contrast, if two or more records have different partition keys values, then their sequence numbers alone do not necessarily reflect their relative order. For example, a record having a sequence number 001 from partition key B is guaranteed to be older than a record having a sequence number 002 from partition key B. However, the record having a sequence number 001 from partition key B is not guaranteed to be older than a record having a sequence number 002 from partition key A In the example of FIG. 1, records in data stream 120 that have partition key values A-H are mapped to shard 130. In this example, the records in data stream 120 that have partition ley values A-H are records 101-114, and these records are included in a data stream shard portion 119. Because partition key values A-H are assigned to shard 130, the records that include partition key values A-H (records 101-114) are also assigned to shard 130. As shown in FIG. 1, in this example, shard 130 is implemented using virtual shards 131-132. It is noted that, in addition to records 101-114, the data stream 120 may also optionally include additional records (in one or more other data stream shard portions) having additional partition key values that may be mapped to one or more other shards that may be implemented using additional virtual shards (not shown in FIG. 1). As shown in FIG. 1, virtual shard 131 has a respective batcher 181, a respective invoker 141 and a respective processing function 151. In some examples, batcher 181 may group records into batches based on various limits, such as a limit on an amount of data (e.g., a limit of 6 megabits) that may be included in a batch, a limit on a quantity of records that may be included in a batch, and a limit on an amount of time for creating a batch. Invoker 141 may request and retrieve batches of records from the batcher 181. Invoker 141 may also invoke processing function 151 for processing of each retrieved batch of records. In some examples, processing function 151 may be a serverless processing function that may run code without provisioning or managing of servers. The processing function 151 may, for example, run code only when needed and scale automatically. This may be advantageous to customers of the processing function 151, for example by allowing the customers to be charged only for consumed computing time and to not be charged for time when code is not running. As also shown in FIG. 1, virtual shard 132 has a respective batcher 182, a respective invoker 142 and a respective processing function 152, which may batch, invoke and process records for virtual shard 132 in a similar manner as batcher 181, invoker 141 and processing function 151 described above for virtual shard 131.

As also shown in FIG. 1, a user interface 160 may be provided, for example by a service that may host execution of the data stream processing system 100. The user interface 160 may allow a customer of the service to select and configure various features that may be employed to control the processing of the data stream 120. In the example of FIG. 1, these features include a target record age, a minimum parallelization factor, a maximum parallelization factor, and ordered processing. Specifically, input field 161 allows a user to select and enter a target record age (in minutes). The target record age may be a value determined by the user that may correspond to a target age for a record at the time that the processing of the record is successfully completed. In the example of FIG. 1, the user has set the target record age to 20 minutes. Input field 162 allows a user to select and enter a minimum parallelization factor. The minimum parallelization factor may be a value determined by the user that may correspond to a minimum quantity of virtual shards that are used to implement each shard. In the example of FIG. 1, the user has set the minimum parallelization factor to two. For example, if there are ten shards that are used to process data stream 120, then a minimum of twenty virtual shards will be employed to implement those ten shards (because each shard will have a minimum of two respective virtual shards).

Input field 163 allows a user to select and enter a minimum parallelization factor. The maximum parallelization factor may be a value determined by the user that may correspond to a maximum quantity of virtual shards that are used to implement a common shard. In the example of FIG. 1, the user has set the maximum parallelization factor to seven. For example, if there are ten shards that are used to process data stream 120, then a maximum of seventy virtual shards will be employed to implement those ten shards (because each shard will have a maximum of seven respective virtual shards). It is noted that, while each shard is required to have a respective quantity of virtual shards that are within the specified minimum and maximum values, there is no requirement that each shard must be implemented using the same quantity of virtual shards. For example, shard 130 could be implemented using two virtual shards, while another shard could be implemented using four virtual shards. In order to set the minimum and maximum parallelization factors, the user may wish to balance his or her willingness to accept potential delays as opposed to potential cost increases. For example, setting the minimum and/or maximum parallelization factors too low may result in processing delays that are unacceptable to the user, while setting the minimum and/or maximum parallelization factors too high may result in higher costs than are unacceptable to the user.

Checkbox 164 allows the user to select whether ordered processing is performed for the data stream. In the example of FIG. 1, checkbox 164 is checked/activated to indicate that the user has selected that ordered processing will be performed. When ordered processing is selected (as in the case of FIG. 1), the records in data stream 120 are processed in order such that a virtual shard that is employed to process a record is determined based on the record's partition key value. For example, by processing all records for partition key B on the same virtual shard, it can be ensured that a record having sequence number 001 of partition key B is processed before a record having sequence number 002 of partition key B. If the records for partition key B were distributed across multiple virtual shards, it may not be possible to guarantee that the record having sequence number 001 of partition key B is processed before a record having sequence number 002 of partition key B. When ordered processing is not selected, the records in data stream 120 are not processed in order, meaning that a record's partition key value may not be determinative of which virtual shard is selected to process the record. Selecting of unordered processing may potentially reduce delays, such as by allowing records to be more evenly distributed across virtual shards. However, this may result in records being processed out of order.

As described above, in the example of FIG. 1, two virtual shards 131 and 132 are employed to implement a shard 130 to which partition keys A-H are assigned. As also described above, in the example if FIG. 1, the user has selected ordered processing (e.g., via checkbox 164). This means that the records in data stream 120 are processed in order such that a virtual shard that is employed to process a record is determined based on the record's partition key value. As shown in FIG. 1, in order to help ensure that records are processed in order, a mapping 170 may be generated that maps partition key values to virtual shards. Specifically, mapping 170 includes a key value column 171 and a virtual shard column 172. Key value column 171 lists key values A-H, while virtual shard column 172 lists the virtual shard to which each key value A-H is currently assigned. Because shard 130 is implemented using virtual shards 131-132, each key value A-H must be mapped to either virtual shard 131 or virtual shard 132. As shown in mapping 170, key values A, C, E and G are mapped to virtual shard 131, and key values B, D, F and H are mapped to virtual shard 132. As shown in FIG. 1, mapping 170 may be accessible to routing component 122, which may route each record 101-114 that is assigned to a partition key A-H to either virtual shard 131 or virtual shard 132 based on the mapping 170.

A parallelization factor may indicate a quantity of virtual shards across which a shard's processing load may be distributed. The techniques described herein may allow the parallelization factor to be adjusted dynamically, after processing of records has already started. This may allow the parallelization factor to be adjusted in response to observed processing conditions, such as whether, and how quickly, a processing delay is increasing or decreasing. The disclosed techniques may therefore allow a parallelization factor to be increased in response to processing delays, thereby allowing the delays to be reduced. Additionally, when a processing delay is reduced to an acceptable level, the techniques disclosed herein may also allow the parallelization factor to be decreased, thereby potentially reducing resource usage and customer costs. In the example of FIG. 1, monitoring component 123, which is computer-executed, monitors virtual shards 131 and 132 in order to determine the observed processing conditions. Specifically, in some examples, monitoring component 123 may monitor a record age of records at the time that processing of the records is successfully completed by virtual shards 131 and 132. In some examples, the monitoring component 123 may sample the record age of processed records from virtual shards 131 and 132 at repeating intervals, such as every minute, etc.

Referring now to FIG. 2, a first example of monitoring information, such as may be generated by monitoring component 123, will now be described in detail. As shown in FIG. 1, the monitoring information may include record age information 200. In this example, the record age information 200 is a table that includes a sample time column 211 and a record age column 212. Sample time column 211 lists a time at which the record age of records processed by virtual shards 131 and 132 is sampled by monitoring component 123, and record age column 212 lists the sampled record age for each sample time. Specifically, at minute X, the sampled record age is 9 minutes. At minute X+1, the sampled record age is 10.5 minutes. At minute X+2, the sampled record age is 12 minutes. At minute X+3, the sampled record age is 13.5 minutes. At minute x+4, the sampled record age is 15 minutes. It is noted that there is no requirement that record age must be sampled once every minute, and a different sampling interval may be employed.

Monitoring component 123 may monitor the observed record age to determine if, and to what extent, the observed record age is increasing, decreasing or remaining constant over time. Based on record age information 200, it may be determined that, from minute X through minute X+4, the observed record age has increased from 9 minutes to 15 minutes. The monitoring component 123 may also compare the observed record age to a threshold record age that is based on the target record age. FIG. 2 in includes threshold information 201, which shows the results of a comparison of the current observed record age to the target record age. The threshold record age may be determined as a function of the target record age. In the specific example of FIG. 2, the threshold record age is 70% of the target record age. It is noted however, that other values (e.g., 75% of the target record age) may also be employed. Referring back to FIG. 1, it is shown that the user has selected a target record age of 20 minutes as shown in input field 161. If the threshold record age is 70% of the target record age, then the threshold record age is 14 minutes (because 70% of 20 is 14). Thus, in this example, at minute X+4, which is the most recent sample time, the observed record age is 15 minutes. Thus, as indicated in threshold information 201, the current observed record age (15 minutes) exceeds the threshold record age (14 minutes).

Based on the above and optionally other information, the monitoring component 123 may then determine whether the parallelization factor will increase, decrease, or remain constant. For example, in some cases, if the observed record age is increasing, and if the observed record age has met or exceeded the threshold record age (as in the examples shown in FIG. 2), then monitoring component 123 may increase the parallelization factor (i.e., the quantity of virtual shards). FIG. 2 includes calculations 202, which may be performed by monitoring component 123 and which may relate to a determination of a new parallelization factor. In the example of FIG. 2, a new parallelization factor may be determined based on the current parallelization factor and the rate by which the record age has increased over a recent time window (referred to herein as the record age growth rate). Specifically, in the example of FIG. 2, the new parallelization factor is determined by adding a value of one to the record age growth rate to obtain a sum value. The sum value is then multiplied by the current parallelization factor (Current PF) to result in the new parallelization factor (New PF). These operations are indicated by the mathematical formula (New PF=Current PF (1+Record Age Growth Rate)) shown in the top row of calculations 202. It is noted that this is merely one example formula that may be used to determine an increased parallelization factor and that other formulas or calculations may also be employed.

In the example of FIG. 2, the record age growth rate is calculated based on the most recent five sample points, which in this case equates to the samples collected at minute X through minute X+4. Based on record age information 200, it may be determined that, over the most recent five sample points (from minute X through minute X+4), the observed record age has increased by 1.5 minutes for every minute sampled. Thus, in the example of FIG. 2, the record age growth rate is 1.5. Additionally, in the example of FIG. 2, the current parallelization factor is determined to be two because, as shown in FIG. 1, there are currently two virtual shards 131 and 132. Accordingly, as shown in the middle row of calculations 202, the new parallelization factor is calculated to be five (based on the formula shown in the top row of calculations 202). As also shown in calculations 202, the maximum parallelization factor is set to seven, as indicated by the value of seven shown in input field 163 of FIG. 1. In this example, the calculated new parallelization factor (five) does not exceed the maximum parallelization factor (seven). Accordingly, the calculated new parallelization factor of five is approved. This is reflected in actions 203, which indicates that the quantity of virtual shards is increased from two to five.

Figure 3:
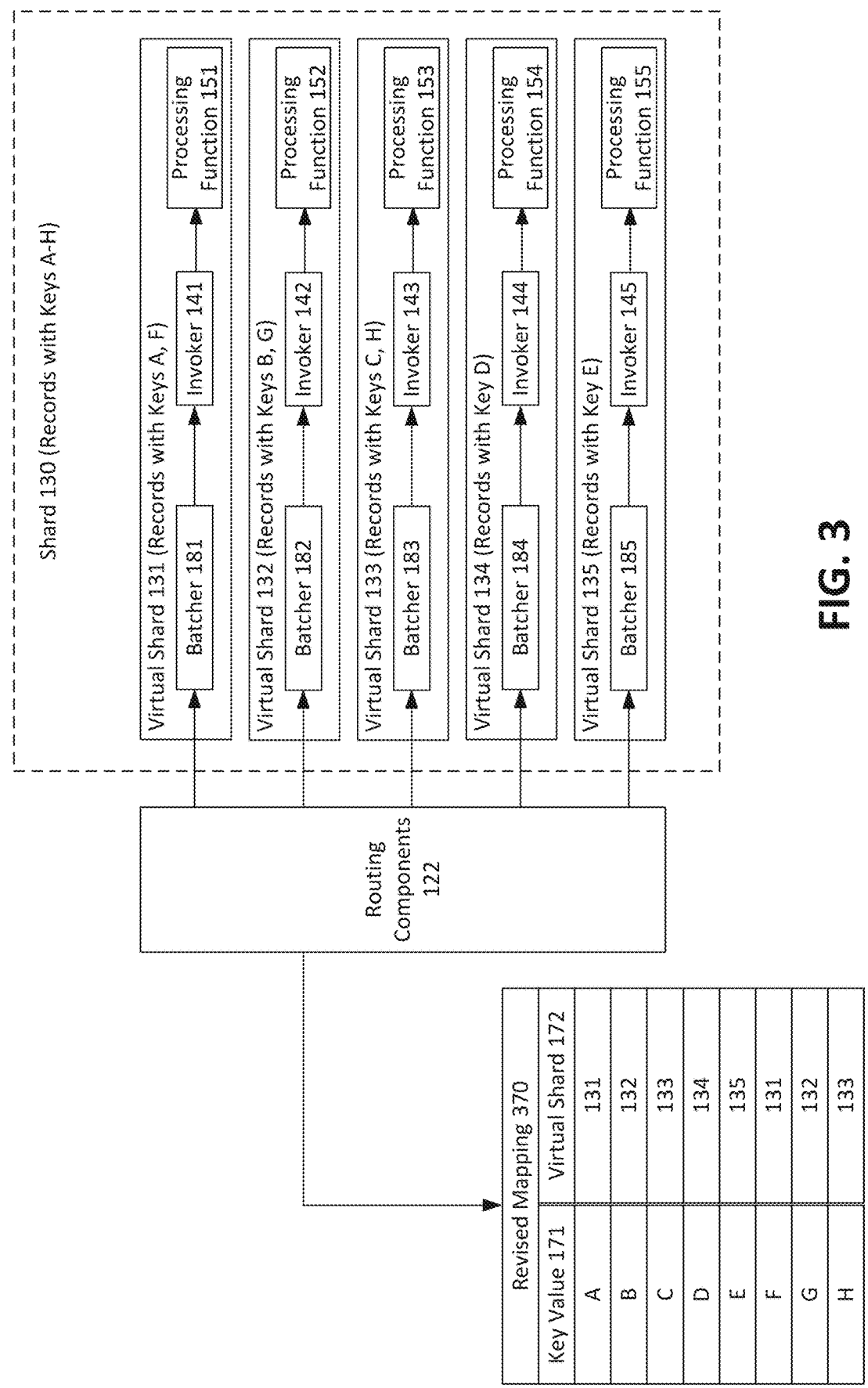
FIG. 3 is a diagram illustrating an example virtual shard configuration based on the first example monitoring information in accordance with the present disclosure.

Referring now to FIG. 3, an example virtual shard configuration based on the monitoring information of FIG. 2 will now be described in detail. As shown in FIG. 3, the quantity of virtual shards used to process key values A-H has increased from two to five. Specifically, in the example of FIG. 3, key values A-H are processed by five virtual shards 131-135, which include virtual shards 131 and 132 (which are pre-existing from FIG. 1) as well as virtual shards 133-135 (which are new to FIG. 3). Virtual shards 133-135 may have batchers 183-185, respectively, which may operate in a manner similar to batchers 181-182 described above with reference to FIG. 1. Virtual shards 133-135 may have invokers 143-145, respectively, which may operate in a manner similar to invokers 141-142 described above with reference to FIG. 1. Virtual shards 133-135 may have processing functions 153-155, respectively, which may operate in a manner similar to processing functions 151-152 described above with reference to FIG. 1.

It is noted that, because the quantity of virtual shards used to implement key values A-H has changed from two to five, it may be necessary to revise the mapping 170 between key values and virtual shards. Accordingly, as shown in FIG. 3, a revised mapping 370 is generated, for example by monitoring component 123, and made available to routing components 122. In the revised mapping 370, key values A and F are mapped to virtual shard 131, key values B and G are mapped to virtual shard 132, key values C and H are mapped to virtual shard 133, key value D is mapped to virtual shard 134, and key value E is mapped to virtual shard 135. In some examples, the overall rate at which records are ingested by shard 130 may remain constant even when the quantity of virtual shards that are used to implement shard 130 is changed. Thus, by increasing the quantity of virtual shards used to implement shard 130, processing delays may be reduced even though the overall rate at which records are ingested by shard 130 may remain constant.

Referring now to FIG. 4, a second example of monitoring information, such as may be generated by monitoring component 123, will now be described in detail. As described above with reference to FIGS. 2-3, at minute X+4, the parallelization factor was increased from two to five. In this example, because parallelization factor was changed at minute X+4, a first cool-off period is triggered at minute X+4. Also, in this example, the first cool-off period is selected to be 2 minutes long. Thus, the first cool-off period extends from minute X+4 to minute X+6. A cool-off period is a period during which the effect of a change to parallelization factor is observed. As shown in record age information 400 of FIG. 4, a record age sample is collected at minute X+5, which indicates that the observed record age has increased from 15 minutes (sampled at minute X+4) to 15.6 minutes (sampled at minute X+5), which is an increase of 0.6 minutes. The record age again increases by 0.6 seconds from minute X+5 to minute X+6. Thus, monitoring component 123 may determine that, during the first cool-off period (from minute X+4 to minute X+6), the observed record age has increased by 0.6 minutes for every minute sampled. Additionally, as shown in threshold information 401, the current observed record age (16.2 minutes) exceeds the threshold record age (14 minutes).

Accordingly, in this example, while increasing the parallelization factor from two to five (at minute X+4) slowed the record age growth rate (from 1.5 to 0.6), the increase was not large enough to stop the record age from increasing altogether. Based on this information, the monitoring component 123 may determine that an additional increase to the parallelization factor is required. FIG. 4 includes calculations 402, which relate to a determination of a new parallelization factor. The example mathematical formula for calculation of the new parallelization factor (New PF=Current PF (1+Record Age Growth Rate)) is shown in the top row of calculations 402. In the example of FIG. 4, the record age growth rate during the first cool-off period (from minute X+4 through minute X+6) is 0.6. Additionally, in the example of FIG. 4, the current parallelization factor is five because, as shown in FIG. 3, there are currently five virtual shards 131-135. Accordingly, as shown in the middle row of calculations 402, the new parallelization factor is calculated to be eight (based on the formula shown in the top row of calculations 402). However, as also shown in calculations 402, the maximum parallelization factor is set to seven, as indicated by the value of seven shown in input field 163 of FIG. 1. In this example, the calculated new parallelization factor (eight) exceeds the maximum parallelization factor (seven). Accordingly, the new parallelization factor is clipped from a calculated value of eight to a resulting value of seven. This is reflected in actions 403, which indicates that the quantity of virtual shards is increased from five to seven.

Figure 5:
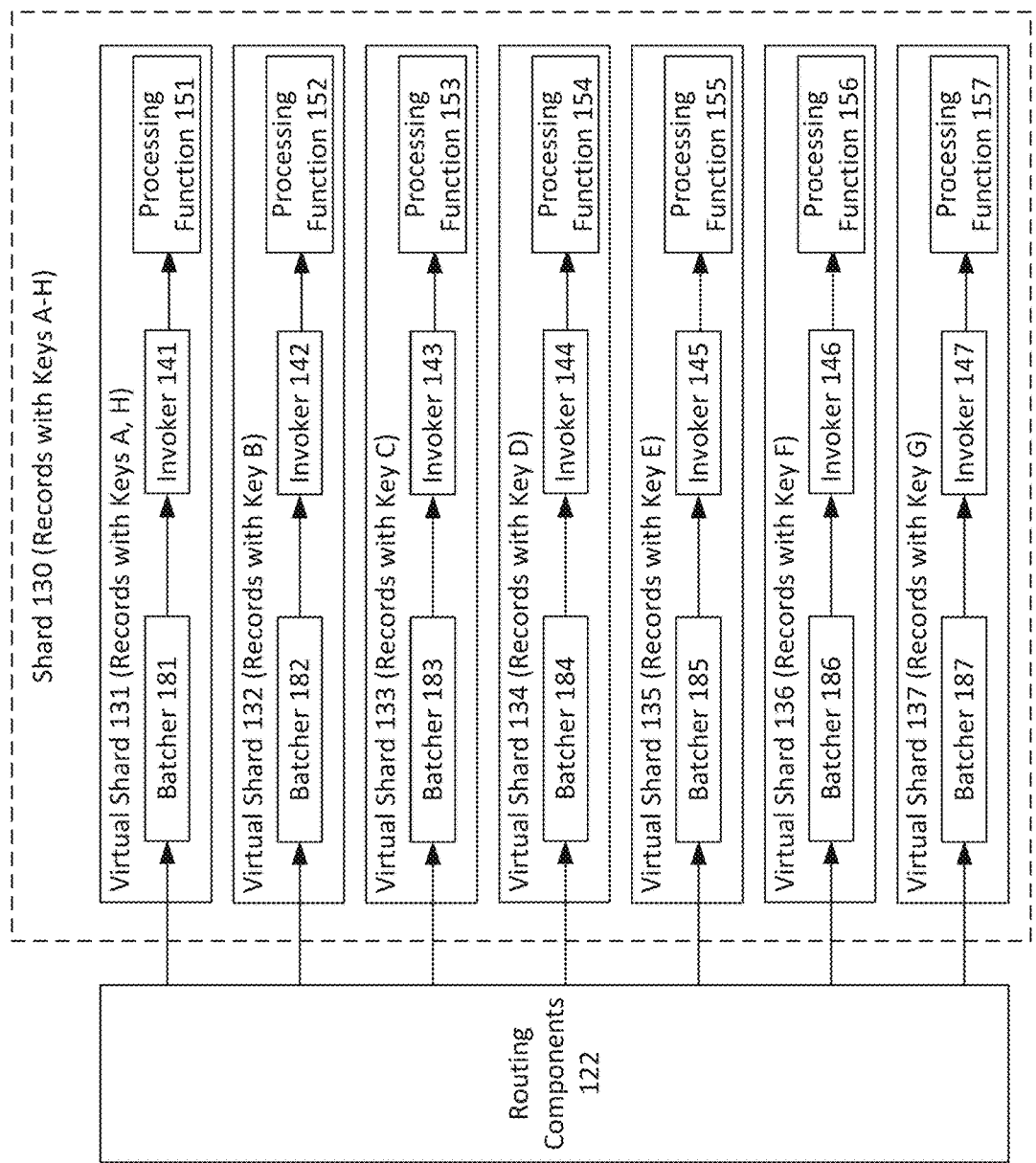
FIG. 5 is a diagram illustrating an example virtual shard configuration based on the second example monitoring information in accordance with the present disclosure.

Referring now to FIG. 5, an example virtual shard configuration based on the monitoring information of FIG. 4 will now be described in detail. As shown in FIG. 5, the quantity of virtual shards used to process key values A-H has increased from five to seven. Specifically, in the example of FIG. 5, key values A-H are processed by seven virtual shards 131-137, which include virtual shards 131-135 (which are pre-existing from FIG. 3) as well as virtual shards 136-137 (which are new to FIG. 5). Virtual shards 136-137 may have batchers 186-187, respectively, which may operate in a manner similar to batchers 181-182 described above with reference to FIG. 1. Virtual shards 136-137 may have invokers 146-147, respectively, which may operate in a manner similar to invokers 141-142 described above with reference to FIG. 1. Virtual shards 136-137 may have processing functions 156-157, respectively, which may operate in a manner similar to processing functions 151-152 described above with reference to FIG. 1.

It is noted that, because the quantity of virtual shards used to implement key values A-H has changed from five to seven, it may be necessary to revise the key value to virtual shard mappings. Accordingly, as shown in FIG. 5, a revised mapping 570 is generated, for example by monitoring component 123, and made available to routing components 122. In the revised mapping 570, key values A and H are mapped to virtual shard 131, key value B is mapped to virtual shard 132, key value C is mapped to virtual shard 133, key value D is mapped to virtual shard 134, key value E is mapped to virtual shard 135, key value F is mapped to virtual shard 136, and key value G is mapped to virtual shard 137.

Referring now to FIG. 6, a third example of monitoring information, such as may be generated by monitoring component 123, will now be described in detail. As described above with reference to FIGS. 4-5, at minute X+6, the parallelization factor was increased from five to seven. In this example, because parallelization factor was changed at minute X+6, a second cool-off period is triggered at minute X+6. Also, in this example, the second cool-off period is selected to be 2 minutes long. Thus, the second cool-off period extends from minute X+6 to minute X+8. As shown in record age information 600 of FIG. 6, a record age sample is collected at minute X+7, which indicates that the observed record age has decreased from 16.2 minutes (sampled at minute X+6) to 15.7 minutes (sampled at minute X+7), which is a decrease of 0.5 minutes. The record age again decreases by 0.5 minutes from minute X+7 to minute X+8. It is noted that, in the above examples, the first cool off-period (related to FIG. 4) and the second cool-off period (related to FIG. 6) have the same durations (i.e., two minutes). It is noted, however, that different cool-off periods may sometimes have different respective durations relative to one another. For example, in some cases, to help avoid processing delays, a shorter cool-off period may be employed when the record age is increasing than when the record age is decreasing. Thus, in some examples, the first cool off-period (related to FIG. 4) may be shorter than the second cool-off period (related to FIG. 6).

Accordingly, in the example of FIG. 6, increasing the parallelization factor from five to seven (at minute X+6) caused the record age to start to decrease. In this example, because the record age is decreasing, the monitoring component 123 may examine decrease rules 601 to determine whether to decrease the parallelization factor. Specifically, when the record age is decreasing, it may sometimes be advantageous to decrease the parallelization factor, for example in order to reduce resource usage and reduce customer costs. However, it may not necessarily be advantageous to reduce the parallelization factor in all scenarios in which the record age decreases. For example, if the current observed record age is above the target record age, then it may not be advantageous to reduce the parallelization factor because the record age is still higher than desired. Additionally, if the current observed record age is below the threshold record age, then it may also not be advantageous to reduce the parallelization factor because the record age may already be sufficiently low. Thus, when the record age is decreasing, the monitoring component 123 may compare the current observed record age to both the target record age and the threshold record age. As indicated by decrease rules 601, the parallelization factor may be decreased (in this example by one) if the current observed record age is below the target record age and above the threshold record age and if the decrease would not cause the new parallelization factor to drop below the minimum parallelization factor. In this example, the current observed record age (15.2 minutes) is below the target record age (20 minutes). Additionally, the current observed record age (15.2 minutes) is above the threshold record age (14 minutes). Furthermore, decreasing the parallelization factor by one (from seven to six) would not cause the new parallelization factor (six) to drop below the minimum parallelization factor (two). Based on this information, the monitoring component 123 may determine to decrease the parallelization factor from seven to six, as indicated in actions 602.

Figure 7:
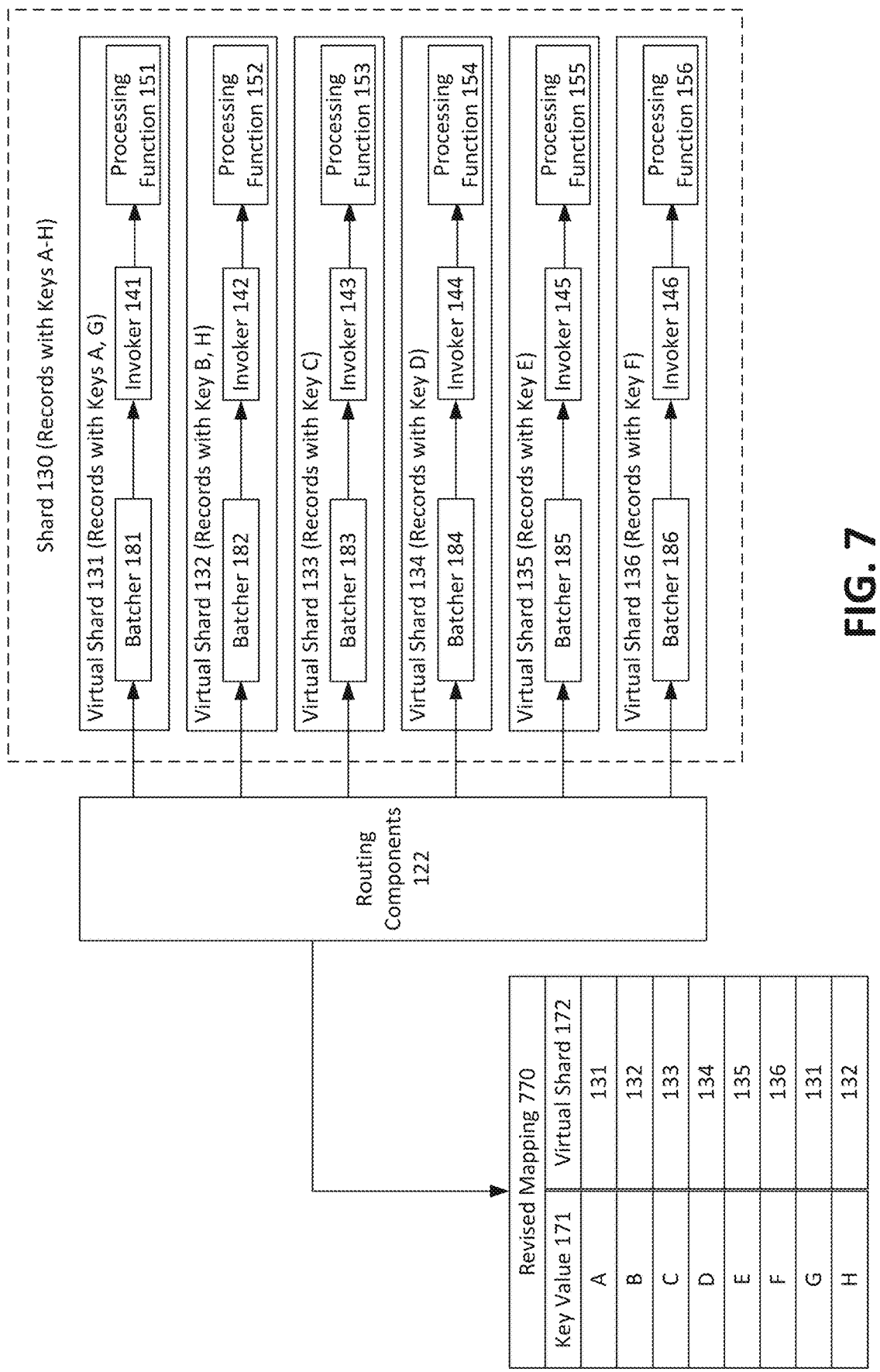
FIG. 7 is a diagram illustrating an example virtual shard configuration based on the third example monitoring information in accordance with the present disclosure.

Referring now to FIG. 7, an example virtual shard configuration based on the monitoring information of FIG. 6 will now be described in detail. As shown in FIG. 7, the quantity of virtual shards used to process key values A-H has decreased from seven to six. Specifically, in the example of FIG. 7, key values A-H are processed by six virtual shards 131-136. It is noted that, because the quantity of virtual shards used to implement key values A-H has changed from seven to six, it may be necessary to revise the key value to virtual shard mappings. Accordingly, as shown in FIG. 7, a revised mapping 770 is generated, for example by monitoring component 123, and made available to routing components 122. In the revised mapping 770, key values A and G are mapped to virtual shard 131, key values B and H are mapped to virtual shard 132, key value C is mapped to virtual shard 133, key value D is mapped to virtual shard 134, key value E is mapped to virtual shard 135, and key value F is mapped to virtual shard 136.

In the examples of FIGS. 1, 3, 5 and 7, a round robin technique is used to assign key values to virtual shards. In the round robin technique, a first key value (e.g., key value A) is mapped to a first virtual shard (e.g., virtual shard 131). Each subsequent key value is then mapped to a subsequent virtual shard until all virtual shards are filled with an equal amount of key values (or there are no more key values). For example, as shown in FIG. 7, key values B-F are mapped to virtual shards 132-136, respectively. The above steps are then repeated until all key values are mapped. For example, as shown in FIG. 7, the next key value (e.g., key value G) is assigned to the first virtual shard (e.g., virtual shard 131).

Each subsequent key value is then mapped to a subsequent virtual shard until all virtual shards are filled with an equal amount of key values (or there are no more key values). For example, as shown in FIG. 7, the key values G and H are mapped to virtual shards 132 and 133, respectively. In some examples, the round robin technique may be advantageous by helping to ensure that an equal (or approximately equal) quantity of key values are assigned to each virtual shard. It is noted, however, that other techniques may be employed. For example, in some cases, a hashing technique may be employed to assign key values to partition keys. For example, in some cases, for each key value, a hash code of the key value may be computed, such as via MD5 (Message Digest 5), SHA-1 (Security Hash Algorithm 1), Java String or other techniques. Modulo division may then be performed with the total number of virtual shards to form a resulting number. A value of one may then be added to the resulting number to form a final result, and the partition key may then be mapped to a virtual shard indicated by the final result. In some examples, this type of hashing technique may be advantageous because it may allow assignment of key values to virtual shards without requiring large amounts of memory usage.

In some examples, each virtual shard may have a buffer that may store batches, such as after the batches are created but before they are processed. In one specific example, a virtual shard buffer may be capable of holding two batches of records. Also, in some examples, the virtual shards may employ an optimistic invoking technique. This means that, if there is an invoker that can't catch up to the processing speed of the other invokers, the other invokers will continue processing the next batch of records until the slow/failing virtual shard buffer fills up. This may assist in allowing the virtual shards to continue to process records even when a temporary slow-down occurs during processing of one or more of those virtual shards. Additionally, by blocking more records from being added to the other virtual shards when one of the virtual shard buffers becomes full, the other virtual shards may be prevented from moving too far ahead of the slow/failing virtual shard.

Figure 8:
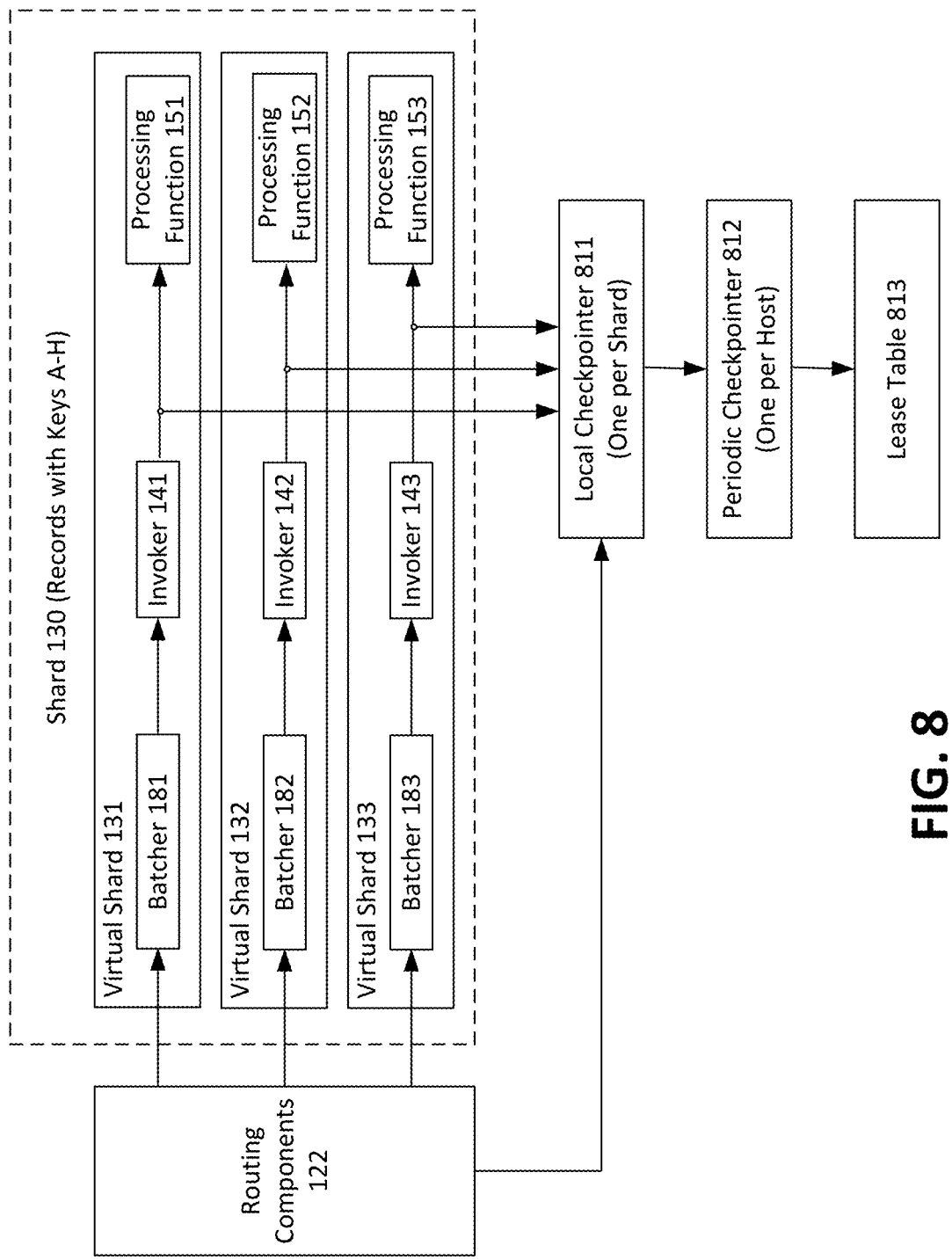
FIG. 8 is a diagram illustrating an example virtual shard checkpointing system in accordance with the present disclosure.

In some examples, a checkpointing technique may be employed in order to confirm when records are processed successfully. Referring now to FIG. 8, an example checkpointing system will now be described in detail. FIG. 8 shows an example in which shard 130 is implemented using three virtual shards 131-133. In some cases, each shard may have a respective local checkpointer, such that there is one local checkpointer per shard. For example, as shown in FIG. 8, shard 130 has a local checkpointer 811. Local checkpointer 811 may store a reference of the sequence numbers being routed/queued by routing components 122. Upon success of record processing or record expired within an invoke task, a corresponding invoker 141-143 may send a signal to local checkpointer 811 marking the corresponding batch of records as completed The invoker 141-143 may also attempt to launch a local checkpointer task (if none is currently running) that may execute asynchronously from the invoke path to update the checkpoint to a periodic checkpointer 812. The periodic checkpointer 812 may be a host level object that keeps the latest checkpoints for the shards on the host. In some examples, further updates may then be made from the periodic checkpointer 812 to lease tables 813. In this manner, the completion of record processing may be efficiently monitored and recorded, even when processing of those records is distributed across multiple virtual shards.

Figure 9:
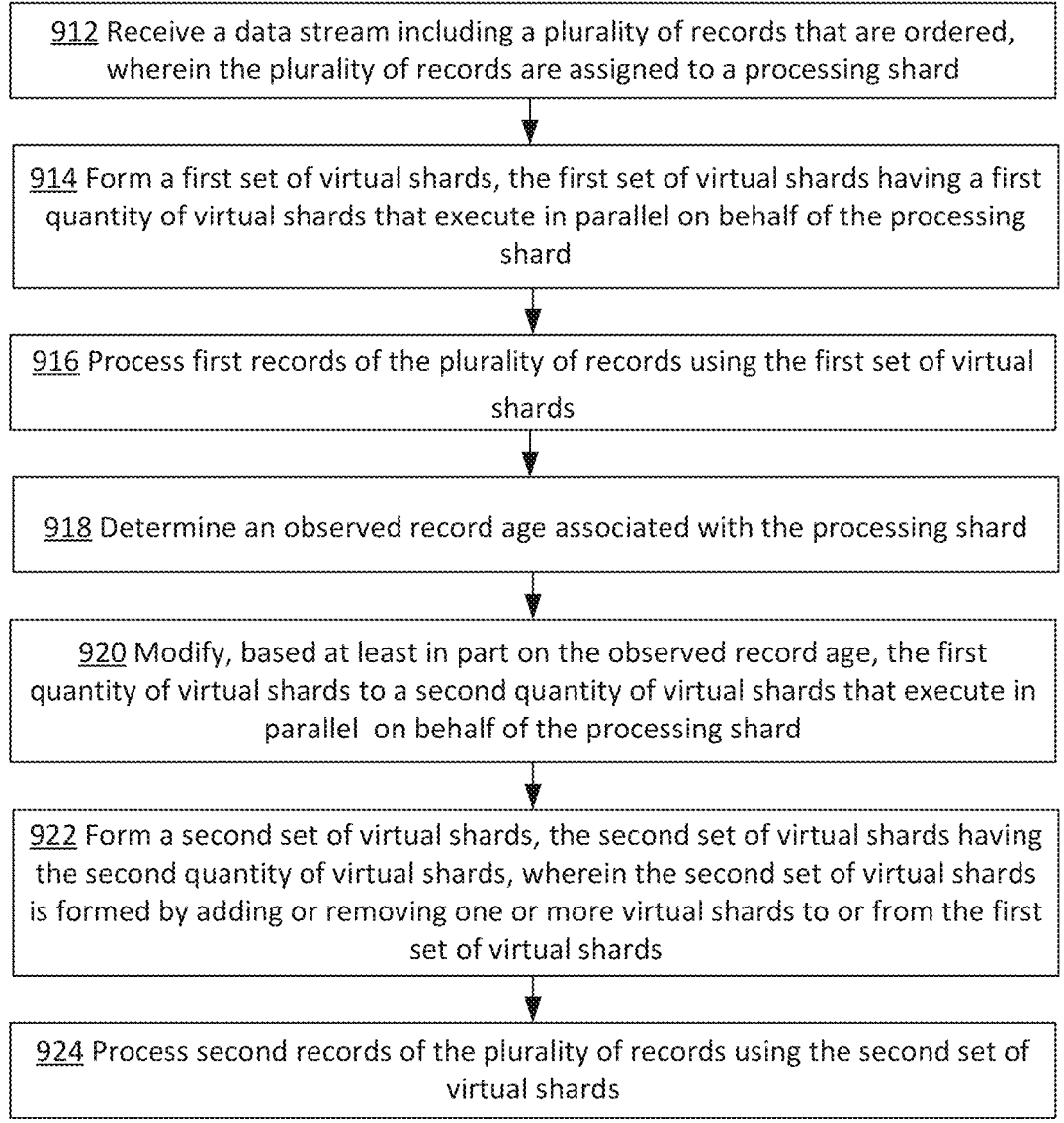
FIG. 9 is a flowchart illustrating an example process for intra-shard parallelization of data stream processing using virtual shards that may be used in accordance with the present disclosure.

FIG. 9 is a flowchart illustrating an example process for intra-shard parallelization of data stream processing using virtual shards that may be used in accordance with the present disclosure. The process of FIG. 9 is initiated at operation 912, at which a data stream is received including a plurality of records that are ordered, wherein the plurality of records are assigned to a processing shard. For example, as shown in FIG. 1, data stream 120 includes a plurality of records (e.g., records 101-114) that have partition key values A-H. The records 101-114 are assigned to shard 130 because key values A-H are assigned to shard 130. The records 101-114 are received by routing components 122. The plurality of records may be ordered based at least in part on a plurality of key values. Each record of the plurality of records may be assigned a respective key value of the plurality of key values. In some examples, in association with processing of a data stream, one or more indications of one or more parameters may be received. For example, one or more indications may be received of a target record age, a minimum parallelization factor, and/or a maximum parallelization factor. In some examples, the one or more indications may include one or more selections from one or more users. For example, one or more selections of a target record age, a minimum parallelization factor, and/or a maximum parallelization factor may be received from one or more users.

At operation 914, a first set of virtual shards is formed, the first set of virtual shards having a first quantity of virtual shards that execute in parallel on behalf of the processing shard. For example, as shown in FIG. 1, a first set of virtual shards includes two virtual shards 131 and 132, which execute in parallel on behalf of shard 130. Thus, in the example of FIG. 1, the first quantity of virtual shards is two. The first set of virtual shards may be formed by generating and allocating a respective batcher and invoker to each virtual shard in the first set of virtual shards. The first set of virtual shards may also be formed based on a parallelization factor, such as an initial parallelization factor that may be used at the initiation of data stream processing. In some examples, the initial parallelization factor may be set to the minimum parallelization factor or may be based on a relationship between the minimum and maximum parallelization factors (e.g., may be set to a value halfway between the minimum and maximum parallelization factors, etc.).

A modifiable mapping of the plurality of key values to virtual shards may be maintained, for example by monitoring component 123 and/or routing components 122. The mapping may indicate, for each key value of the plurality of key values, a respective virtual shard for processing of the key value. One example of this mapping is mapping 170 of FIG. 1. Mapping 170 indicates to which virtual shard of the first set of virtual shards (e.g., virtual shards 131-132) each of key values A-H is currently mapped.

At operation 916, first records of the plurality of records are processed using the first set of virtual shards. For example, as described above, each virtual shard may have a respective batcher that creates batches of records. Each virtual shard may also have a respective invoker that requests and receives a batch of records and then invokes a respective processing function that processes the batch of records. As also described above, the virtual shards may process the first records in parallel, such as to improve processing efficiency and reduce delays.

At operation 918, an observed record age associated with the processing shard is determined. As described above, the observed record age may be determined by a monitoring component that monitors ages of records at the time that their processing is successfully completed. In some examples, the observed record age may be an average of observed record ages from each of the virtual shards in the first set of virtual shards. As also described above, the monitoring component may sample the observed record age at regular intervals, such as once every minute. In some examples, the monitoring component may examine a most recent sample of the observed record age and one or more prior samples in order to determine whether the observed record age is increasing, decreasing or remaining constant.

At operation 920, the first quantity of virtual shards is modified to a second quantity of virtual shards that execute in parallel operations on behalf of the processing shard. The first quantity of virtual shards may be modified to the second quantity of virtual shards based at least in part on the observed record age. For example, the first quantity of virtual shards may be modified to the second quantity of virtual shards based at least in part on whether the observed record age is increasing or decreasing. In particular, modifying of the first quantity of virtual shards to the second quantity of virtual shards may include increasing the first quantity of virtual shards to the second quantity of virtual shards based at least in part on an increase in the observed record age. By contrast, modifying of the first quantity of virtual shards to the second quantity of virtual shards may include decreasing the first quantity of virtual shards to the second quantity of virtual shards based at least in part on a decrease in the observed record age.

The first quantity of virtual shards may be modified to the second quantity of virtual shards based at least in part on a relationship between the observed record age and the target record age. For example, the first quantity of virtual shards may be modified to the second quantity of virtual shards based at least in part on a comparison of the target record age to a threshold record age that is a function of the target record age (e.g., 70% of the target record age). Specifically, in some cases, if the observed record age is increasing and if the observed record age is above the threshold record age (e.g., is above a certain percentage of the target record age), then the first quantity of virtual shards may be increased. As another example, in some cases, if the observed record age is decreasing, and if the observed record age is between the target record age and the threshold record age, then the first quantity of virtual shards may be decreased. The first quantity of virtual shards may also be modified to the second quantity of virtual shards based at least in part on a rate at which the observed record age is increasing or decreasing. The first quantity of virtual shards may also be modified to the second quantity of virtual shards based in part on the maximum parallelization factor. For example, the quantity of virtual shards that are used to implement the processing shard may be prohibited from exceeding the maximum parallelization factor. The first quantity of virtual shards may also be modified to the second quantity of virtual shards based in part on the minimum parallelization factor. For example, the quantity of virtual shards that are used to implement the processing shard may be prohibited from being below the parallelization factor.

At operation 922, a second set of virtual shards is formed, the second set of virtual shards having the second quantity of virtual shards. The second set of virtual shards may be formed by adding or removing one or more virtual shards to or from the first set of virtual shards. For example, as shown in FIG. 3, a second set of virtual shards includes five virtual shards 131-135, which execute in parallel on behalf of shard 130. Thus, in the example of FIG. 3, the second quantity of virtual shards is five. Also, in the example of FIG. 3, the second set of virtual shards is formed adding virtual shards 133-135 to the first set of virtual shards (which included virtual shards 131-132). A respective batcher and invoker may be allocated to each virtual shard in the second set of virtual shards. Maintaining of the mapping of the plurality of key values to virtual shards may include modifying of the mapping based on the second set of virtual shards. For example, mapping 170 of FIG. 1 may be modified to revised mapping 370 of FIG. 3. Revised mapping 370 indicates to which virtual shard of the second set of virtual shards (e.g., virtual shards 131-135) each of key values A-H is currently mapped.

At operation 924, second records of the plurality of records are processed using the second set of virtual shards. For example, as described above, each virtual shard may have a respective batcher that creates batches of records. Each virtual shard may also have a respective invoker that requests and receives a batch of records and then invokes a respective processing function that processes the batch of records. As also described above, the virtual shards may process the second records in parallel, such as to improve processing efficiency and reduce delays.

Figure 10:
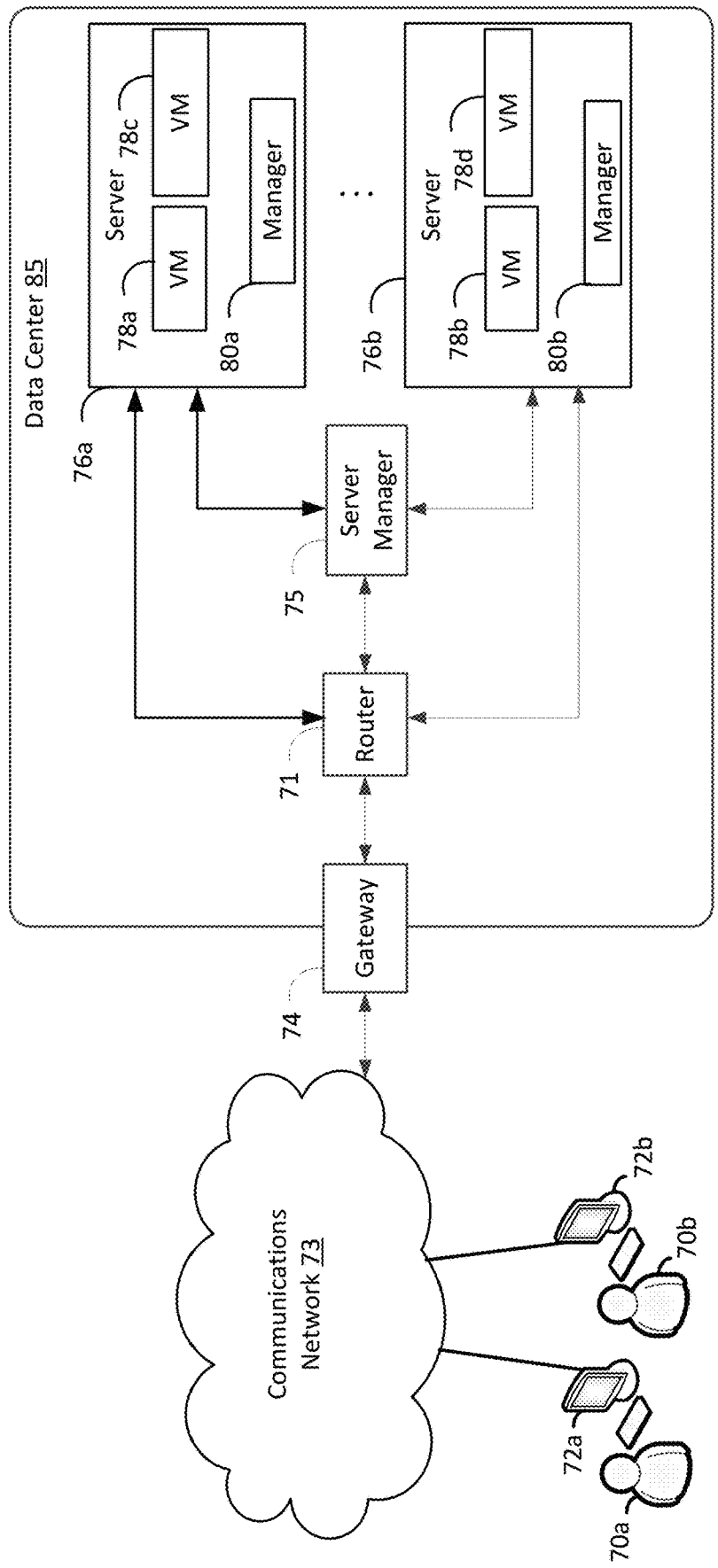
FIG. 10 is a diagram illustrating an example system for transmitting and providing data that may be used in accordance with the present disclosure.

An example system for transmitting and providing data will now be described in detail. In particular, FIG. 10 illustrates an example computing environment in which the embodiments described herein may be implemented. FIG. 10 is a diagram schematically illustrating an example of a data center 85 that can provide computing resources to users 70*a* and 70*b* (which may be referred herein singularly as user 70 or in the plural as users 70) via user computers 72*a* and 72*b* (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76*a* and 76*b* (which may be referred herein singularly as server 76 or in the plural as servers 76) that provide computing resources. These resources may be available as bare metal resources or as virtual machine instances 78*a*-*d* (which may be referred herein singularly as virtual machine instance 78 or in the plural as virtual machine instances 78).

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 10, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72*a* or 72*b* may be a server, a desktop or laptop personal computer, a tablet computer, a wireless telephone, a personal digital assistant (PDA), an e-book reader, a game console, a set-top box or any other computing device capable of accessing data center 85. User computer 72*a* or 72*b* may connect directly to the Internet (e.g., via a cable modem or a Digital Subscriber Line (DSL)). Although only two user computers 72*a* and 72*b* are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 10 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80*a* or 80*b* (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 10, a router 71 may be utilized to interconnect the servers 76*a* and 76*b*. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 10, a server manager 75 is also employed to at least in part direct various communications to, from and/or between servers 76*a* and 76*b*. While FIG. 10 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 10 has been greatly simplified and that many more networks and networking devices may be utilized to interconnect the various computing systems disclosed herein. These network topologies and devices should be apparent to those skilled in the art.

It should also be appreciated that data center 85 described in FIG. 10 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 11:
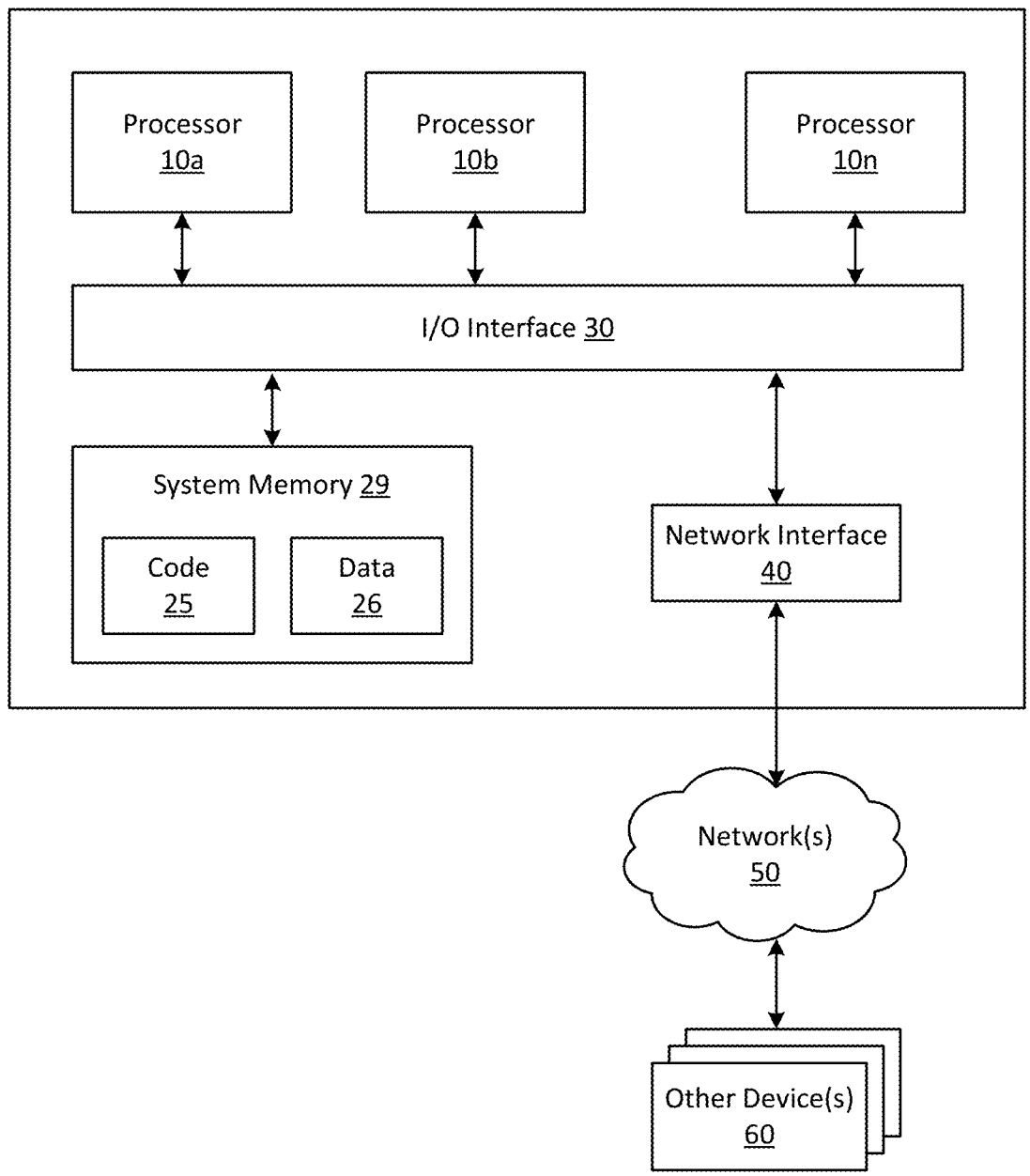
FIG. 11 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 11 depicts a computer system that includes or is configured to access one or more computer-accessible media. In the illustrated embodiment, computing device 28 includes one or more processors 10a, 10b and/or 10n (which may be referred herein singularly as "a processor 10" or in the plural as "the processors 10") coupled to a system memory 29 via an input/output (I/O) interface 30. Computing device 28 further includes a network interface 40 coupled to I/O interface 30.

In various embodiments, computing device 28 may be a uniprocessor system including one processor 10 or a multiprocessor system including several processors 10 (e.g., two, four, seven or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 29 may be configured to store instructions and data accessible by processor(s) 10. In various embodiments, system memory 29 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 29 as code 25 and data 26.

In one embodiment, I/O interface 30 may be configured to coordinate I/O traffic between processor 10, system memory 29 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 28 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 29 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 28 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 28 as system memory 29 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:
one or more processors; and
one or more memories having stored therein computing instructions that, upon execution by the one or more processors, cause the computing system to perform operations comprising:
receiving a data stream including a plurality of records that are ordered, wherein the plurality of records are assigned to a processing shard;
receiving an indication of a target record age;
forming a first set of virtual shards, the first set of virtual shards having a first quantity of virtual shards that execute in parallel on behalf of the processing shard;
processing first records of the plurality of records using the first set of virtual shards;
determining an observed record age associated with the processing shard;
modifying, based at least in part on a relationship between the observed record age and the target record age, the first quantity of virtual shards to a second quantity of virtual shards that execute in parallel on behalf of the processing shard;
forming a second set of virtual shards, the second set of virtual shards having the second quantity of virtual shards, wherein the second set of virtual shards is formed by adding or removing one or more virtual shards to or from the first set of virtual shards; and
processing second records of the plurality of records using the second set of virtual shards.

2. The computing system of claim 1, wherein the modifying of the first quantity of virtual shards to the second quantity of virtual shards comprises increasing the first quantity of virtual shards to the second quantity of virtual shards based at least in part on an increase in the observed record age.

3. The computing system of claim 1, wherein the modifying of the first quantity of virtual shards to the second quantity of virtual shards comprises decreasing the first quantity of virtual shards to the second quantity of virtual shards based at least in part on a decrease in the observed record age.

4. The computing system of claim 1, wherein the operations further comprise receiving an indication of a maximum parallelization factor, wherein the modifying of the first quantity of virtual shards to the second quantity of virtual shards is based in part on the maximum parallelization factor.

5. The computing system of claim 1, wherein the operations further comprise receiving an indication of a minimum parallelization factor, wherein the modifying of the first quantity of virtual shards to the second quantity of virtual shards is based in part on the minimum parallelization factor.

6. A computer-implemented method comprising:
receiving a data stream including a plurality of records that are ordered, wherein the plurality of records are assigned to a processing shard;
forming a first set of virtual shards, the first set of virtual shards having a first quantity of virtual shards that execute in parallel on behalf of the processing shard;
processing first records of the plurality of records using the first set of virtual shards;
determining an observed record age associated with the processing shard;
modifying, based at least in part on the observed record age, the first quantity of virtual shards to a second quantity of virtual shards that execute in parallel on behalf of the processing shard;
forming a second set of virtual shards, the second set of virtual shards having the second quantity of virtual shards, wherein the second set of virtual shards is formed by adding or removing one or more virtual shards to or from the first set of virtual shards; and
processing second records of the plurality of records using the second set of virtual shards.

7. The computer-implemented method of claim 6, further comprising receiving an indication of a target record age, wherein the modifying of the first quantity of virtual shards to the second quantity of virtual shards is based at least in part on a relationship between the observed record age and the target record age.

8. The computer-implemented method of claim 6, wherein the modifying of the first quantity of virtual shards to the second quantity of virtual shards comprises increasing the first quantity of virtual shards to the second quantity of virtual shards based at least in part on an increase in the observed record age.

9. The computer-implemented method of claim 6, wherein the modifying of the first quantity of virtual shards to the second quantity of virtual shards comprises decreasing the first quantity of virtual shards to the second quantity of virtual shards based at least in part on a decrease in the observed record age.

10. The computer-implemented method of claim 6, further comprising receiving an indication of a maximum parallelization factor, wherein the modifying of the first quantity of virtual shards to the second quantity of virtual shards is based in part on the maximum parallelization factor.

11. The computer-implemented method of claim 6, further comprising receiving an indication of a minimum parallelization factor, wherein the modifying of the first quantity of virtual shards to the second quantity of virtual shards is based in part on the minimum parallelization factor.

12. The computer-implemented method of claim 6, wherein the plurality of records are ordered based at least in part on a plurality of key values, and wherein each record of the plurality of records is assigned a respective key value of the plurality of key values.

13. The computer-implemented method of claim 12, further comprising maintaining a mapping of the plurality of key values to virtual shards, wherein the mapping indicates, for each key value of the plurality of key values, a respective virtual shard for processing of the key value.

14. One or more non-transitory computer-readable storage media having stored thereon computing instructions that, upon execution by one or computing devices, cause the one or more computing devices to perform operations comprising:
receiving a data stream including a plurality of records that are ordered, wherein the plurality of records are assigned to a processing shard;
forming a first set of virtual shards, the first set of virtual shards having a first quantity of virtual shards that execute in parallel on behalf of the processing shard;
processing first records of the plurality of records using the first set of virtual shards;
determining an observed record age associated with the processing shard;
modifying, based at least in part on the observed record age, the first quantity of virtual shards to a second quantity of virtual shards that execute in parallel on behalf of the processing shard;
forming a second set of virtual shards, the second set of virtual shards having the second quantity of virtual shards, wherein the second set of virtual shards is formed by adding or removing one or more virtual shards to or from the first set of virtual shards; and
processing second records of the plurality of records using the second set of virtual shards.

15. The one or more non-transitory computer-readable storage media of claim 14, further comprising receiving an indication of a target record age, wherein the modifying of the first quantity of virtual shards to the second quantity of virtual shards is based at least in part on a relationship between the observed record age and the target record age.

16. The one or more non-transitory computer-readable storage media of claim 14, wherein the modifying of the first quantity of virtual shards to the second quantity of virtual shards comprises increasing the first quantity of virtual shards to the second quantity of virtual shards based at least in part on an increase in the observed record age.

17. The one or more non-transitory computer-readable storage media of claim 14, wherein the modifying of the first quantity of virtual shards to the second quantity of virtual shards comprises decreasing the first quantity of virtual shards to the second quantity of virtual shards based at least in part on a decrease in the observed record age.

18. The one or more non-transitory computer-readable storage media of claim 14, further comprising receiving an indication of a maximum parallelization factor, wherein the modifying of the first quantity of virtual shards to the second quantity of virtual shards is based in part on the maximum parallelization factor.

19. The one or more non-transitory computer-readable storage media of claim 14, wherein the plurality of records are ordered based at least in part on a plurality of key values, and wherein each record of the plurality of records is assigned a respective key value of the plurality of key values.

20. The one or more non-transitory computer-readable storage media of claim 19, further comprising maintaining a mapping of the plurality of key values to virtual shards, wherein the mapping indicates, for each key value of the plurality of key values, a respective virtual shard for processing of the key value.

\* \* \* \* \*